No. 666,746. Patented Jan. 29, 1901.
H. G. FISKE.
PNEUMATIC TIRE.
(Application filed Apr. 26, 1899.)
(No Model.)
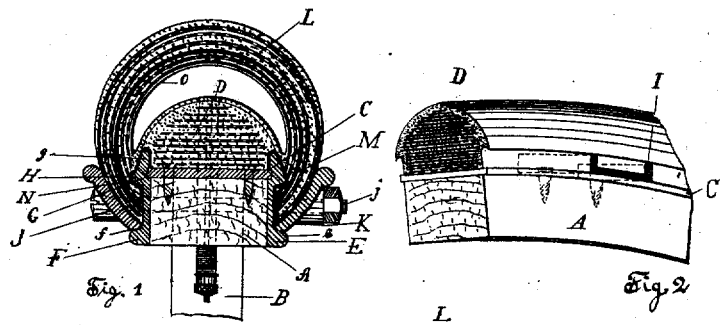
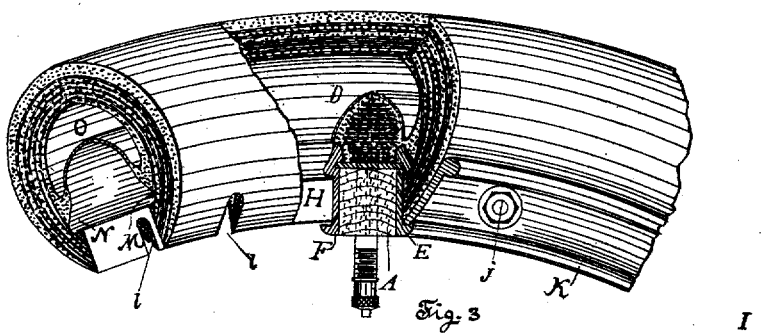
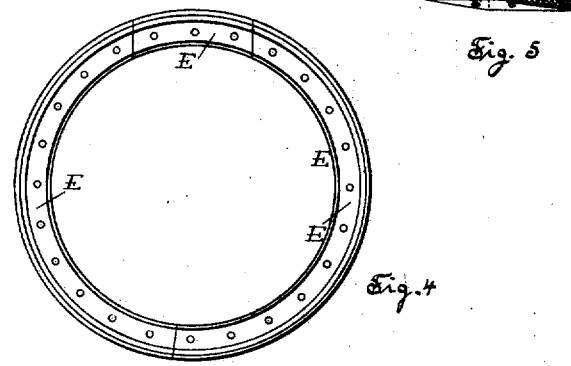
Witnesses:
Inventor:
Henry G. Fiske

UNITED STATES PATENT OFFICE.

HENRY G. FISKE, OF NEW YORK, N. Y., ASSIGNOR, BY MESNE ASSIGNMENTS, TO THE COLUMBIA AND ELECTRIC VEHICLE COMPANY, OF JERSEY CITY, NEW JERSEY, AND HARTFORD, CONNECTICUT.

PNEUMATIC TIRE.

SPECIFICATION forming part of Letters Patent No. 666,746, dated January 29, 1901.

Application filed April 26, 1899. Serial No. 714,498. (No model.)

*To all whom it may concern:*

Be it known that I, HENRY G. FISKE, a citizen of the United States of America, and a resident of the city of New York, county of New York, and State of New York, have invented certain new and useful Improvements in Pneumatic Tires, of which the following is a specification.

My invention relates to improvements in pneumatic tires; and it consists in details of construction and arrangement of a pneumatic tire and a supporting-rim of a wheel therefor which especially adapts said tire to sustain a heavy load and to be readily repaired or replaced, and, furthermore, to provide such a construction that in case of serious injury to the tire, whereby the same is deflated while the vehicle is in use, parts of the tire when deflated or collapsed will coact as a cushion-tire to carry the vehicle to a place where it can be repaired without further injury to the tire.

In the accompanying drawings, Figure 1 is a vertical transverse section of my improved tire and rim. Fig. 2 is a detailed view showing the felly, the riding-cushion carried thereby, and the means for preventing creeping of the same. Fig. 3 shows the tire and rim in elevation, also an end section of the tire proper, and a broken-away view showing the rim, felly, and riding-cushion as arranged in practice. Fig. 4 is a side elevation of the felly and reinforcing-plates. Fig. 5 is a detailed view in perspective of the device for holding the riding-cushion upon the felly against creeping.

As indicated in the drawings, my improved tire and rim comprise, preferably, a wooden felly A, into which the spokes B are secured in any desired manner.

C is a metallic band placed about the periphery of the felly to strengthen and hold it firmly together.

D is what I have termed a "riding-cushion" and is in the form of a semicircular body resting upon the band C and composed of alternating layers of fabric and rubber.

E F are side plates arranged one on each side of the felly to add strength and rigidity thereto, also to secure the riding-cushion D in position, and the side plates E F are also formed with projecting edges $e f$ to carry the lower edges of the rim-flanges, as will appear. The upper inner sides of the plates E F are formed with a rabbet G to receive the edges of the band C, and the said side plates E F form extensions $g$, extending above the periphery of the felly in order to hold the riding-cushion D in position. The upward extensions $g$ of the side plates E F are also formed with outwardly-extending ribs H to assist in holding the tire in position.

In order to prevent the riding-cushion D from moving around the felly when in use, or creeping, I provide a number of channel-plates I, which are secured transversely to the felly upon the periphery of the band C and engage corresponding notches in said riding-cushion, whereby the same is absolutely prevented from creeping.

The rim proper for my improved wheel is composed of laterally-extending flange-plates J K, which are secured in proper relation to the felly by transverse bolts $j$, and the said flange-plates rest with their lower edges upon the projections $e f$ of the side plates E F.

The tire proper is of the detachable single-tube type and comprises a reinforced casing L, having notched edges M N, adapted to fit between the laterally-extending flange-plates J K and the side plates E F, secured to the felly. The edges of the casing L are formed with notches $l$, which fit over the transverse bolts $j$ and also permit a slight expansion or stretching of the casing necessary to pass its edges over the felly and into place.

For convenience of assembling I find it necessary to construct the side plates E F in sections, a subdivision such as illustrated in Fig. 4 being sufficient for the purpose. In this figure the plate E is divided at its lower part, and the two side pieces E' E$^2$ are completed by a short section E$^3$ inserted in the top. When all of the bolts $j$ have been withdrawn, if the piece E$^3$ is removed the side pieces E' E$^2$ come together and so materially reduce the diameter of the said side plates that they can be withdrawn without difficulty.

A feature of special importance in my invention is that while maintaining the ordinary form of tire from an exterior point of view and at the same time using a casing which is heavily reinforced I also employ an inner air-tube of the usual type. I also employ the riding-cushion D, which projects upward into the space ordinarily occupied by the air-tube of a pneumatic tire, reducing the space available therefor and at the same time conforming the air-tube into crescent shape. Ordinarily this would possess no particular significance, but under the peculiar circumstances of the present invention the said construction has the advantage that the summit of the riding-cushion is brought very near to the outer part of the casing, so that if the tire were deflated a comparatively small extent of collapse could occur and when the casing rested upon the riding-cushion it would still project considerably beyond the edges of the rim and provide a mass of resilient material capable of carrying the weight without permitting the said edges of the rim to come into contact with the casing.

As indicated the casing is strongly reinforced by numerous layers of fabric incorporated with rubber, of which the casing is composed. The inner inflatable air-tube O is secured to the casing at its upper portion, its lower part resting upon the riding-cushion, the said lower part being therefore accessible for inspection for repair when the said casing has been removed from the wheel.

Minor changes and modifications may be made in the invention without departing therefrom.

Therefore without limiting myself to the exact construction shown, what I claim, and desire to secure by Letters Patent, is—

1. The combination in a tire, of a detachable casing having an inflatable portion, a felly, plates or rings laterally attachable to said felly by bolts or like devices extending from side to side of said felly, said plates coacting with the casing to secure the same to the rim, and a yielding riding-cushion on said felly extending beyond the outer limits of any felly portion or the lateral attachable plates and into the space inclosed by the outer casing, as and for the purpose described.

2. In a pneumatic tire the combination with a detachable casing, of a felly against the sides of which the edges of the casing rest, exterior laterally-extending flanges secured to the felly by bolts passing therethrough and through the edges of the casing, and a riding-cushion upon the periphery of the felly and extending into the space in the casing.

3. The combination with a pneumatic tire, of a rim therefor comprising a felly, a riding-cushion upon said felly, side plates secured to the felly and holding said riding-cushion, and transverse ridges attached to the felly and engaging the under side of the cushion to prevent creeping and laterally-extending plates attached to the sides of the felly to form the rim proper, and a detachable casing having its edges secured between the lateral plates and the sides of the felly.

4. A rim for pneumatic tires comprising a felly, side plates attached thereto and having projecting lower edges, laterally-extending flanges on each side of said felly having their lower edges resting upon the ridges at the edges of the plates, and bolts extending through the flanges, the plates, and the felly, for securely holding them in position.

5. A rim for pneumatic tires, comprising a felly, a compression-band upon the periphery thereof, side plates secured to said felly and engaging the peripheral band and laterally-extending flange-plates on each side of the felly having their lower edges supported upon extensions from the side plates, and bolts passing through the flanges, side plates, and felly to unite the same to form a tire-supporting rim.

Signed by me at New York, N. Y., this 25th day of April, 1899.

HENRY G. FISKE.

Witnesses:
FRANKLAND JANNUS,
DAVID GRANT.